US005418953A

United States Patent [19]

Hunt et al.

[11] Patent Number: 5,418,953
[45] Date of Patent: May 23, 1995

[54] METHOD FOR AUTOMATED DEPLOYMENT OF A SOFTWARE PROGRAM ONTO A MULTI-PROCESSOR ARCHITECTURE

[75] Inventors: Peter D. Hunt; Jon K. Elliott, both of Pleasanton; Richard J. Tobias, San Jose; Alan J. Herring, San Jose; Craig R. Morgan, San Jose; John A. Hiller, Palo Alto, all of Calif.

[73] Assignee: Loral/Rohm Mil-Spec Corp., San Jose, Calif.

[21] Appl. No.: 46,028

[22] Filed: Apr. 12, 1993

[51] Int. Cl.$^6$ .................. G06F 9/40; G06F 15/82
[52] U.S. Cl. .................. 395/650; 364/DIG. 1; 364/281.3; 364/284.4; 364/281.7; 364/281.8; 364/281.6
[58] Field of Search ............. 364/DIG. 1; 395/650

[56] References Cited

U.S. PATENT DOCUMENTS 5,021,947 6/1991 Campbell et al. ............. 364/200
5,247,675 9/1993 Farrell et al. ................. 395/650

OTHER PUBLICATIONS

Proceeding of IEEE vol.: V77 Issue: N12 pagination p. 1879 (17) pub. date: Dec., 1989, Author: Parhi Keshab U. Title: Algorithm Transformation Techniques For Concurrent Processors.
Computer Design vol. V24 Issue N10 pagination pp. 57–66 pub. date Aug. 15, 1985 Author Hindin 11J Title: parallel processing premisses faster program execution.
16 page publication entitled "Ptolemy: A Mixed-Paradigm Simulation/Prototyping Platform in C++", J. Buck, et al. Sept. 6, 1991.
"Algorithms For High Level Synthesis: Resource Utilization Based Approach" by Miodrag M. Potakonjak, Memorandum No. UCB/ERL M92/10, Jan. 1992, Electronics Research Laboratory, College of Engineering, Univ. of Calif., Berkeley.
"Hardware Mapping and Module Selection in the Hyper Synthesis System" by Chi–Min Chu, Memorandum No. UCB/ERL M92/46, May, 1992, Electronics Research Laboratory, College of Engineering, Univ. of Calif., Berkeley.

Primary Examiner—Gareth D. Shaw
Assistant Examiner—Majid A. Banankhah
Attorney, Agent, or Firm—Perman & Green

[57] ABSTRACT

A method is employed for pre-assignment and pre-scheduling of tasks that enables allocation across multiple physical processors arranged in a variety of architectures. The method comprises the steps of: constructing a DFG of tasks to be performed to provide a solution for a problem; determining cost values for each task and the overall problem, such cost values taking into account a target multiprocessor architecture and factors such as elapsed task execution times. The method pre-assigns the tasks to logical processors and assures that inter-dependent tasks are executable by logical processors that are within required communications delay criteria of each other. The assigning action attempts to arrive at a minimal cost value for all tasks comprising the problem. The pre-assigned tasks are then pre-scheduled based upon a performance criteria and are converted to machine code. The machine code is then deployed to physical processors in the target multi-processor architecture. The deploying action maps the logical processors' pre-assigned programs (comprising assigned tasks) onto physical processors, using data regarding the multi-processor architecture and the current utilization of the physical processors in the architecture, all while assuring that inter-dependent tasks are mapped so as to fulfill interprocessor communication delay criteria.

8 Claims, 3 Drawing Sheets

METHOD FOR AUTOMATED DEPLOYMENT OF A SOFTWARE PROGRAM ONTO A MULTI-PROCESSOR ARCHITECTURE

FIELD OF THE INVENTION

This invention relates to multi-processor architectures, and more particularly, to a method and apparatus for automatically deploying a software procedure onto a multi-processor architecture to enable efficient and parallel run-time performance of the software procedure.

BACKGROUND OF THE INVENTION

Multi (i.e., parallel) processor architectures employ many interconnected processors to access large amounts of data and to simultaneously process a large number of tasks at high speed. Many multi-processors can execute instructions with operands that are arrays of data and are called vector or array processors. In order to obtain maximum utilization of a multi-processor, as many tasks as possible need to be scheduled for simultaneous execution on the available processors. Furthermore, interrelationships between various tasks must be continuously taken into account so as to assure ready availability of input operands when each task is ready to run. Scheduling of a task must be carefully controlled or else the entire benefit derived from the parallel processing may be lost, because one processor, due to a lack of necessary input data can delay a plurality of others.

Data Flow Graphs (DFG's) are often used by scientists and engineers to enable visualization of individual procedure tasks and their interrelationships. A DFG is a directed graph wherein edges (interconnections) denote data flows and nodes are functions or tasks that manipulate the data. The execution of a task, called the firing of a node, occurs when enough data is available on each input edge of the node. Associated with an input edge is a property called the threshold. When the data meets or exceeds the threshold on each of the input edges, the node fires. Each time the node fires, it "consumes" some amount of data from each edge that serves as an input to the node. The amount of data the node consumes is less than or equal to the threshold value. Each time a node fires, it produces some amount of data and places it on its output edges. Normally, this data is then consumed by some set of other nodes.

To aid in an understanding of terms to be used herein, the following definitions are provided:

Primitive/Task—The task or function represented by a node of a DFG is a primitive. A primitive may be any procedure that is preprogrammed and available from a library of procedures, to perform a specific task.

Node—A graphical representation of a primitive. While a node in a DFG is performed on a processor, the term node does not represent the processor, but rather the specific primitive that is carried out by the processor.

Threshold—Before a node fires, each input edge must contain at least as many data items as are necessary for the task to execute properly. The threshold parameter specifies the minimum quantity of data needed on a particular input edge before the node can fire.

Subgraph Execution Program (SEP)—a program constructed from one or more primitives that executes sequentially on a processor, a SEP executes as one program; the primitive tasks within it execute sequentially in a predetermined order.

Allocation—The process of dynamically managing physical processor utilization by allocating logical processor subgraph execution programs to available spare processor resources.

Deployment—The distribution of object code to processors in a multi-processor, such code enabling the processors to perform, in parallel, an algorithm defined by a DFG.

Pre-scheduling—A scheduling method wherein a program determines a firing order based upon how much data each primitive consumes and produces.

In general, there are two basic approaches to executing a DFG on a multi-processor. One method is to assign and schedule nodes using a "run time ready" assessment manager. The second method is called pre-scheduling and defines a "fixed schedule" for each task in advance of executing the DFG.

Run time ready assessment is a scheduling method wherein each input stream of DFG primitive is examined by a run time program. When the thresholds of all input streams for a primitive are met, the primitive is ready to be executed, i.e. "fired". Several primitives may be ready to fire at one time. The run time program executes ready primitives as it finds them, in any order. In addition to scheduling, the assignment of primitives to a processor is necessary on a multi-processor system. If assignment of primitives is accomplished during run time, significant amounts of run time compute and inter-processor communication resources are consumed.

There are significant problems with run time scheduling and assignment procedures. One such problem is termed "hiccup" and results when a series of primitive executions fail to meet a preestablished real-time deadline. A second problem is the finding quickly of an optimal multi-processor assignment and schedule. Such a problem is an NP-complete problem.

An NP-complete problem is a class of problems that do not have a closed form solution, however an optimum solution can be found by an exhaustive search. The classical NP-complete problem is the traveling salesman problem wherein it is desired to establish the most efficient route over which a salesman can travel and still achieve the required stops. Such a problem is solved by an exhaustive search of all possibilities, followed by a subsequent analysis of the results of each search iteration to determine an optimum solution. An exhaustive search of all possibilities requires long run times, which time grows exponentially as a function of the size of the input set. Thus, a run time ready scheduler requires substantial compute power and results in excessive use of interprocessor communication resources to arrive at optimal scheduling and assignment of primitives.

The problems described for run time scheduling and assignment can be avoided by defining a pre-schedule for each task in advance of executing the DFG. Such pre-scheduling includes a pre-assignment of primitives as one of its functions. Pre-assignment and pre-scheduling may incur exponential run times in finding optimal solutions, prior to deployment of object code for execution, so heuristic and probabilistic approximation methods are used. Pre-assignment and pre-scheduling are traditionally handled by the individual programmer employing a DFG representation of the required procedure and then proceeding to attempt a plurality of assignment/schedule iterations to determine one which is near-optimal. This is both time consuming and expensive and has retarded the application of scientific problems to multi-processors.

Recently, software packages have become available that enable achievement of a higher level of automated scheduling of tasks on multi-processors. One such software package is titled Ptolemy and is further described in "Ptolemy: A Mixed-Paradigm Simulation/Prototyping Platform in C++", Internal College of Engineering Paper, University of California, Berkeley, Calif. A further such software package is called HYPER described in "Hardware Mapping and Module Selection in the Hyper Synthesis System", C. Chu, Memorandum UCB/ERL M92/46, (1992), College of Engineering, University of California, Berkeley, Calif. and in "Algorithms for High Level Synthesis: Resource Utilization Based Approach", M. Potkonjak, Memo No UCB/ERL M92/10, (1992) College of Engineering, University of California, Berkeley, Calif.

PTOLEMY enables a complex scientific problem to be programmed as a DFG, where primitives are then assigned to physical processors in an existing multi-processor architecture. HYPER is similar to Ptolemy except it maps one DFG to an application specific integrated circuit. HYPER is limited to digital signal processing applications. Both programs employ the concept of pre-assignment and pre-scheduling of tasks and enable allocation of the tasks across known multi-processor or integrated circuit architectures. However, neither of these programs, nor any others known to the inventors hereof, enable run time allocation of pre-assignment and pre-scheduling tasks to a variety of multi-processor architectures. The prior art is thus limited in applicability to fixed processor allocations of pre-scheduled/pre-assigned DFGs.

Accordingly, it is an object of this invention to provide an improved method for allocating tasks of a complex problem across a variety of multi-processor architectures.

It is another object of this invention to provide an improved method for allocation of tasks which have been pre-assigned and pre-scheduled on logical processors and mapped to physical processors in a selected multi-processor architecture.

SUMMARY OF THE INVENTION

A method is employed for pre-assignment and pre-scheduling of tasks that enables allocation across multiple physical processors arranged in a variety of architectures. The method comprises the steps of: constructing a DFG of tasks to be performed to provide a solution for a problem; determining cost values for each task and the overall problem, such cost values taking into account a target multi-processor architecture and factors such as elapsed task execution times. The method pre-assigns the tasks to logical processors and assures that inter-dependent tasks are executable by logical processors that are within required communications delay criteria of each other. The assigning action attempts to arrive at a minimal cost value for all tasks comprising the problem.

The pre-assigned tasks are then pre-scheduled based upon a performance criteria and are converted to machine code. The machine code is then deployed to physical processors in the target multi-processor architecture. The deploying action maps the logical processors' pre-assigned programs (comprising assigned tasks) onto physical processors, using data regarding the multi-processor architecture and the current utilization of the physical processors in the architecture, all while assuring that inter-dependent tasks are mapped so as to fulfill interprocessor communication delay criteria.

DETAILED DESCRIPTION OF THE INVENTION

To enable the tasks comprising a complex problem to be deployed across processors in a multi-processor architecture, the invention employs a DFG of the problem solution to both pre-assign and pre-schedule the individual tasks that lead to an execution of the solution of the problem. Each task is assigned to a "logical processor", a logical processor being a data structure that defines an eventual physical processor's functions and performance requirements. In addition to assigned tasks, each logical processor is also assigned criteria which must be fulfilled when the task or tasks to be carried out by the logical processor are deployed onto a physical processor in a chosen multi-processor architecture. The deployment of pre-assigned, pre-scheduled tasks is accomplished by using a map of available physical processors in the multi-processor architecture, as well as information describing the current utilization and interrelationships of the physical processors.

Figure 1:
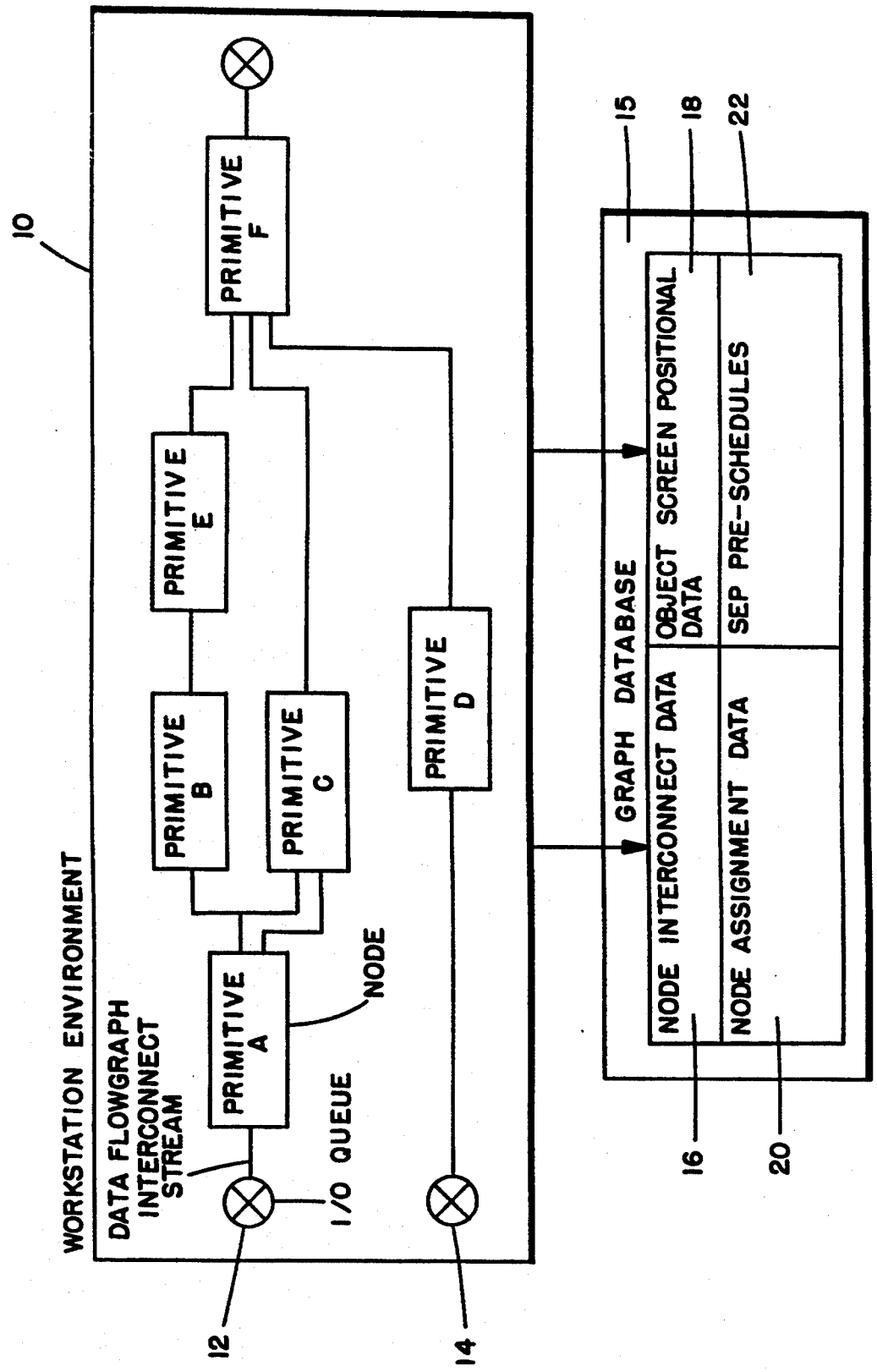
FIG. 1 is a schematic showing of a DFG that feeds into a graph data base which provides a main data base for succeeding actions of the method.

The above resume of the invention will be better understood by initially referring to FIG. 1. In the known manner, a programmer employing a DFG software package constructs a flow graph 10 that illustrates various tasks that comprise a procedure for achieving a solution of a selected problem. Such problems often involve arrays of data and lend themselves to solution on highly parallel, multi-processor architectures. DFG 10 illustrates relationships between a plurality of tasks/primitives employed in the solution of an exemplary problem. Data input to the DFG occurs via input nodes 12 and 14. While each of primitives A–F can exhibit a wide range of complexities, each consists of a task that is predetermined and for which detailed performance data and code object file names already exist in the data base of a data processing system (e.g. a workstation) used to construct the DFG.

Once DFG 10 has been created, the programmer has produced a graph data base 15 that includes a node interconnect file 16 and an object screen positional file 18. Node interconnection file 16 provides complete descriptions of each of the "edges" in DFG 10 and, in combination with the object screen positional file 18, fully describes DFG 10.

Within graph data base 15 are two additional files that are yet to be filled. Node assignment data file 20 will be filled with a list of logical processors, their assigned subgraph execution programs (SEPs), specific primitives to be used during the processing of the SEPs and communication delay criteria between interdependent programs. File 22 will contain pre-schedules for each SEP that defines a sequence of execution of each of the primitives associated with each logical processor listed in node assignment data file 20.

Figure 2:
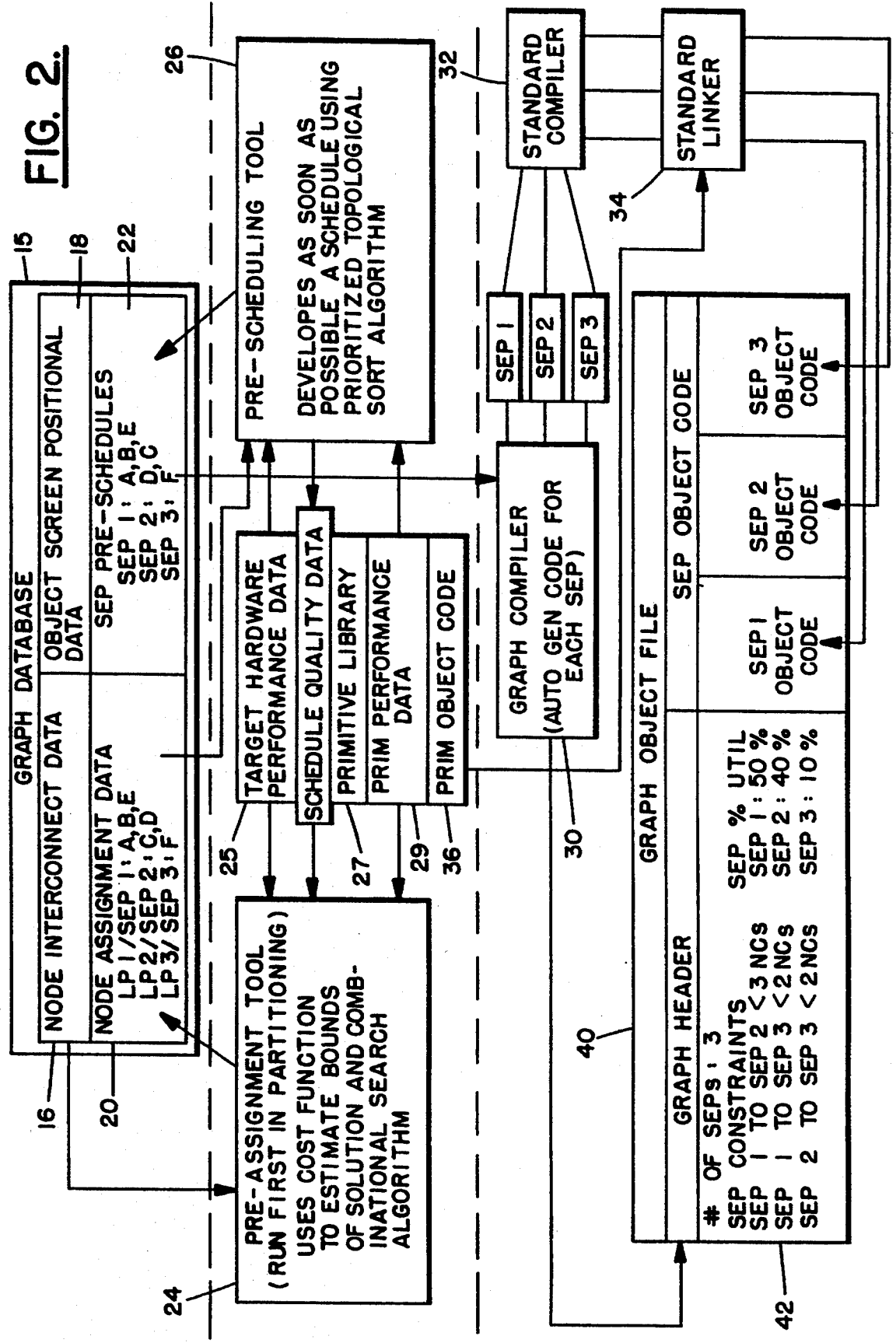
FIG. 2 is a further schematic, showing pre-assignment and pre-scheduling functions of the method, including conversion of assigned and scheduled sub-graph execution programs into object code.
Figure 3:
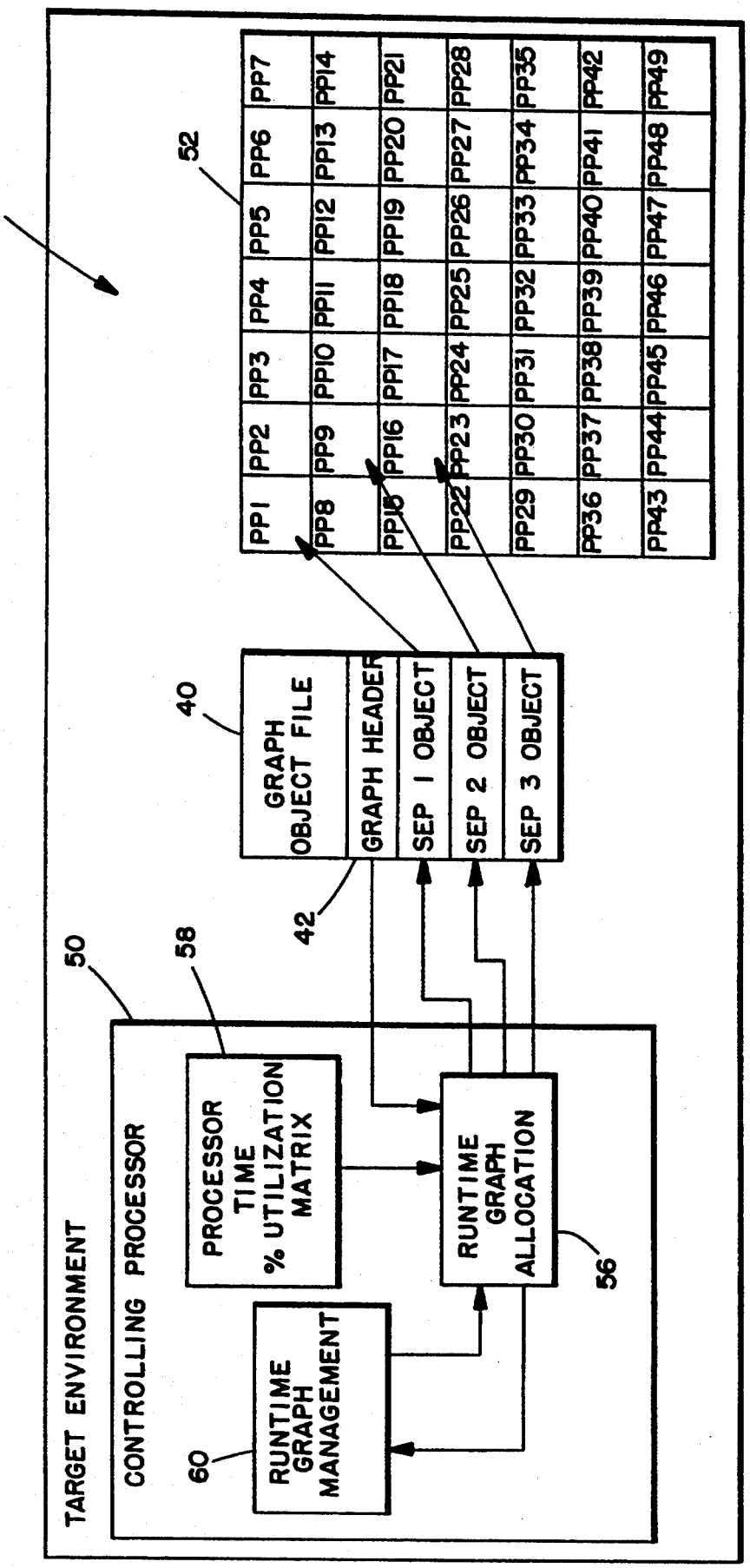
FIG. 3 illustrates the procedures by which logical processors having assigned sub-graph execution programs are deployed onto physical processors in a multi-processor architecture.

Turning to FIG. 2, procedures for both pre-assignment and pre-scheduling will be described. Node interconnect data from file 16 in graph data base 15 is fed to a pre-assignment software "tool" 24 that comprises a procedure for partitioning the primitives in DFG 10 and mapping those primitives onto a plurality of logical processors so that construction of SEPs can be accomplished. A logical processor is to be differentiated from a physical processor in that a logical processor only describes the functions that must be performed by a physical processor to accomplish execution of a SEP from DFG 10. During a subsequent deployment procedure (to be described with respect to FIG. 3), a SEP assigned to a logical processor is deployed onto any physical processor that meets preestablished requirements and has available processing time to accommodate the SEP.

Pre-assignment tool 24 receives input from a file 25 that includes "target" hardware performance data. The target hardware is any chosen multi-processor architecture that is to be used to execute the DFG. By changing the data in file 25 to match a chosen architecture, the pre-assignment and pre-scheduling actions may be matched to the chosen architecture. The data in file 25 defines the architecture of the target hardware in terms of physical processor capabilities and interconnection time delay details. For instance, physical processors may be separated by one or more cross-bar switches, each cross-bar switch inserting a propagation delay between connected processors' memory banks. Such propagation delays are specified and together with individual processor specifications and enable the synthesis of logical processors that bear a resemblance to the target architecture.

A primitive library file 27 includes primitive performance data in file 29 that defines the number of clock cycles required to perform each primitive on the target hardware. Such data enables pre-assignment tool 24 to calculate a cost for both individual tasks and the overall problem, using real hardware-based constants. Importantly, by changing files 25 and 27, pre-assignment tool 24 can be controlled to partition the nodes in DFG 10 in accordance with an entirely different target hardware configuration/performance data picture.

Once pre-assignment tool 24 receives information from node interconnect file 16 and primitive performance file 29, it proceeds to construct an initial partitioning of DFG 10 into SEPs. The partitioning/assignment action is an NP-complete problem and is accomplished by a combinational search algorithm. It will be recalled that pre-assignment tool 24 determines which SEPs (and primitives) are assigned to a logical processor and pre-scheduling tool 26 specifies the order of execution of primitives in each SEP.

Pre-assignment tool 24 initially calculates a cost value for each primitive in DFG 10, as well as an overall cost value for the problem. A cost value for an overall problem is a unitless value that describes the quality of the pre-assignment and preferably includes at least the following elements: logical processor resource costs; measures of difficulty in scheduling; and interprocessor communication delays.

Logical Processor Resource Cost value is a function of the number of logical processors used and the clock cycles consumed by each. The Logical Processor Resource Cost is computed by summing the number of clock cycles used for execution of each primitive assigned to a logical processor.

The Difficulty in Scheduling for each primitive is measured by determining, for each primitive, values that indicate an "as soon as possible" (ASAP) time and an "as late as possible" (ALAP) time when a primitive can be processed within the DFG. The ASAP time is the earliest time a primitive can be executed in the given problem. The ALAP time is the latest time the primitive can be executed, given the specific problem. "Slack" time of a primitive is the interval between the ASAP time and the ALAP time and defines a time span during which a primitive must commence execution. "Overlap" time between two primitives is the overlap of their respective Slack times and indicates a level of interference between the two primitives, if they are to execute at approximately the same time.

The Difficulty in Scheduling factor that results from assigning a particular primitive to a particular logical processor may be found by determining the Overlap time between a primitive and another primitive that exhibits an Overlap. Difficulty in Scheduling is also dependent upon the time span of the respective slack times of the primitives. The larger the Slack times of overlapping primitives, the less they will interfere if their amount of Overlap is small. This function is calculated as shown in equation 1 below.

$$S_A = \sum_{B \in L_{pj}} \frac{O_{AB}}{A_{SL} B_{SL}} \tag{1}$$

Where $L_{pj}$ is logical processor j, $A_{SL}$ is the slack time of primitive A, $B_{SL}$ is the slack time of primitive B and $O_{AB}$ is the slack overlap of primitives A and B. The total scheduling cost of a DFG problem is the sum over all primitives.

A further term of the cost function is the Cost of Interprocessor Communication Delays. The Interprocessor Communication Delay value defines the time delay (in clock cycles) that can be accommodated between logical processors that execute interdependent tasks while adhering to ASAP, ALAP deadlines. Another interprocessor communication cost is the total amount of time needed to transfer the required data.

The cost function is a summation of each of the individual above-described cost elements and forms a measure of a particular pre-assignment action.

The action carried out by pre-assignment tool 24 finds an assignment of Nodes to SEPs and SEPs to logical processors, which assignment provides a minimal cost function for a solution to the overall problem. Solution of the pre-assignment problem involves a combinatorial optimization. An initial assignment is tried, followed by a calculation of its cost function, followed by a succeeding try, etc. After each try, it is determined whether the cost function has increased or decreased, with a decreased cost function being an indication that the direction of change of assignments is leading to a better assignment arrangement.

The outcome of the pre-assignment action is a list of logical processors, each having a particular SEP assigned. Each SEP defines an assigned primitive or primitives to be executed by the logical processor. Accompanying the logical processor assignment schedule is a further schedule which defines required interprocessor communication delay times as between interdependent SEPs that run on the logical processors, i.e., one whose processing state is dependent upon inputs from another.

Given the exemplary problem illustrated in DFG 10, pre-assignment tool 24 causes an assignment of three SEPs to three logical processors (LP1–LP3), as shown in node assignment data file 20. SEP 1 will employ primitives A, B, and E and is assigned to LP1. SEP 2 will be carried out on LP2 and will include primitives C and D, and SEP 3 is assigned to LP3 and includes only primitive F.

The initial pre-assignment data is now passed from node assignment file 20 to pre-scheduling tool 26 so that a sequence of execution of each of the primitives in each SEP can be scheduled. Prescheduling tool 26 employs an ASAP criteria that is derived by topologically sorting the primitives in DFG 10. This action is accomplished by constructing a linear list of nodes in DFG 10, with the first node having data inputs that have no dependencies on any other node and all intermediate nodes having inputs that depend on only earlier nodes in the list. Other inputs to pre-scheduling tool 26 are received from target hardware performance data file 25 and primitive performance data file 29.

Pre-scheduling tool 26 employs the linear list of nodes in combination with data from files 25 and 27 to schedule the execution of each primitive employed in each SEP. Thus, from the linear list, pre-scheduling tool 26 can determine that primitive A is listed above primitive E and that primitive E is also dependent upon primitive B. Thus, the assigned pre-schedule is that SEP 1 executes the primitives in the order A, B, E. Remaining SEPs are scheduled accordingly.

It is possible that no primitive can be scheduled for a particular logical processor in the time slot available, or that some primitive will be scheduled too early. This problem is solved by prioritizing each primitive in DFG 10. Instead of picking the first primitive in the linear list, the primitive with the highest priority is picked. Priority of any primitive is derived by determining the "length" of the path between the primitive and the end of the DFG. The highest priority primitive is established by determining the Node's distance to the end of the DFG. This prioritization technique always assures that the furthest-away primitive will be executed before other primitives, when they are ultimately deployed onto physical processor.

Once a pre-schedule has been derived, it is stored in SEP pre-schedule file 22 and a quality value is calculated indicative of the performance quality of SEP pre-schedule. While a number of quality criteria may be used, a preferred criteria is "gap" time. Gap time is the time span a logical processor is inactive and waiting for a previous logical processor to finish its task and provide necessary data. Schedule quality data may include gap times for individual logical processors and a summation of overall gap time for all SEPs in a DFG.

Pre-assignment tool 24, in response to the schedule quality data from pre-schedule tool 26 modifies task assignments to each logical processor so as to decrease resulting gap times. This action involves the reporting of altered gap times to the user so that a decision may be made regarding the efficacy of task assignment modifications.

Operations of both pre-assignment tool 24 and pre-scheduling tool 26 may iterate either a predetermined number of times or a number of times determined by measurements which indicate that schedule quality data is not improving over plural iterations. At the termination of all iterations, it is presumed that node assignment file 20 and SEP pre-schedule file 22 contains a rear-optimal pre-assignment and pre-schedule of DFG 10.

The contents of file 22 are then fed to graph compiler 30 which generates a source listing for each SEP. In the example shown in FIG. 2, it is assumed that SEP source code files, are in the C language. The resultant files for each of SEPs 1, 2 and 3 are then fed to a standard C compiler 32. Compiler 32 generates an intermediate code (in accordance with standard compiler action) for each of the SEP source files. A standard linker 34 then receives the intermediate code from compiler 32, along with object code describing each primitive from primitive object code file 36 in primitive library 27. Linker 34 then generates executable object code for each of SEPs 1, 2 and 3 and loads the object code into a graph object file 40.

A graph header portion 42 of graph object file 40 is loaded with SEP "constraints" each of which defines for interdependent SEPs, the maximum time distance that can exist between chosen physical processors and still enable execution of interdependent SEPs. For instance (as shown in graph header 42), SEP 1 must be executed on a logical processor that is no greater than 3 time distances away from the processor executing SEP 2.

Graph header portion 42 also includes, for each SEP, a measure of the operating performance capability of a logical processor that is taken up by the execution of the respectively assigned SEP.

The SEP constraints, percent utilization and the SEP object code files are now employed by a controlling processor 50 (see FIG. 3) in a deployment action of the object code onto a plurality of physical processors in a target multi-processor architecture 54. Controlling processor 50 accesses data from graph header file 42 and each of the object code files for SEPs 1, 2 and 3. The data within graph header file 42 is fed to a run time graph allocation procedure 56 within controlling processor 50. Controlling processor 50 also includes a file 58 which keeps track of current availability of all physical processors 52 in multi-processor architecture 54 as well as the percentage of utilization of each physical processor thereof. A run time graph management procedure 60 controls the run time graph allocation function 56 to deploy each of the object code listings for SEPs 1, 2 and 3 to selected ones of the physical processors in multi-processor architecture 54.

Each logical processor and its associated SEP is accessed by run time graph allocation procedure 56. Its SEP, including constraints and percent utilization, is compared against available physical processors 52 within multi-processor architecture 54, and a determination is made as to which physical processor a particular logical processor's SEP is to be assigned. So long as a physical processor has available processing capacity to meet a SEP's processor utilization requirement and is physically positioned with respect to another physical processor executing an interconnected SEP (wherein a time distance constraint exists), deployment of the SEP to the chosen physical processor can be accomplished. If all resource demands of the various SEPs can be satisfied by physical processors within multi-processor architecture 54, allocation function 56 creates a run time execution of the loaded object code and causes input data to be fed to the respective physical processors (containing the graph external input queues) on which the object code have been loaded.

From the above, it can be seen that a DFG representation of a complex process is pre-assigned and pre-scheduled to a plurality of logical processors, based upon pre-loaded target hardware performance data. Then, when object code derived from the pre-assigned, pre-scheduled SEPs is deployed, it can be deployed on the target hardware in accordance with available resources. By supplying the pre-assignment and pre-scheduling tools with time data (execution time, data interconnect time) that represents the performance of a different multi-processor architecture, the procedures illustrated above can be followed, allowing the original DFG to be deployed to a variety of multi-processor architectures with no changes to the software tools.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for assigning, scheduling and allocating tasks that comprise a problem, to multiple physical processors in a multi-processor architecture, said method enabling allocation of said tasks to multiple physical processors arranged in any of a plurality of target architectures, said method comprising the computer implemented steps of:
   (a) deriving through user-computer interaction, a data flow graph (DFG) of tasks to be performed to solve said problem;
   (b) determining execution time cost values for primitive operations comprising each task and said problem;
   (c) pre-assigning said tasks to logical processors, a logical processor comprising a data structure, said pre-assigning partitioning said DFG into subgraph execution programs (SEPs) employing said execution time cost values and target multi-processor architecture data and iteratively modifying partitioning of said SEPs to accomplish set cost criteria;
   (d) pre-scheduling said pre-assigned tasks based upon a performance criteria that, at least, assures that pre-scheduled tasks are data dependent only upon data from earlier performed tasks; and
   (e) deploying code comprising each of said logical processors and their pre-assigned tasks to physical processors arranged in a provided target multi-processor architecture, said deploying using data indicating current utilization of said physical processors arranged in said chosen target architecture to map each logical processor and pre-assigned task onto a physical processor.

2. The method as recited in claim 1 wherein said pre-assigning step (c) includes, for tasks that are interdependent upon each other, determining interprocessor communications time distance constraints for logical processors to which said interdependent tasks are assigned, said pre-assigning further attempting, by iteratively modifying said partitioning of said SEPs, to achieve a minimal cost value for each task and said problem.

3. The method as recited in claim 2, wherein said deploying in step (e) further assures that logical processors with pre-assigned tasks that are interdependent, are mapped onto said physical processors so as to fulfill interprocessor communication time distance constraints determined in step (c).

4. The method as recited in claim 1 wherein said target multi-processor architecture data is used by said pre-assigning step (c) and pre-scheduling step (d) to determine which tasks are to be assigned to said logical processors.

5. The method as recited in claim 4 wherein step (e) determines a current availability of physical processors by maintaining a current utilization record for each physical processor, said current utilization record enabling a determination to be made as to whether a physical processor is available for deployment of a said logical processor and its pre-assigned tasks.

6. The method as recited in claim 5, wherein step (e), in deploying a first logical processor and assigned first task to an available physical processor, additionally, determines whether another physical processor that fulfills an interprocessor communications time distance constraint is available for assignment of a second logical processor and assigned second task, said second logical processor requiring said interprocessor communications time distance constraint and if not available, attempts redeployment of at least one said logical processor to a physical processor that fulfills the interprocessor communications time distance constraint.

7. The method as recited in claim 1 wherein said performance criteria defined in step (d) is that each task should be executed on an as soon as possible (ASAP) basis.

8. The method as recited in claim 1, wherein step (d) further comprises:
   (d1) analyzing each pre-schedule of said pre-assigned tasks to determine a quality measure of the pre-schedule, said quality measure at least dependent upon a gap time-based measure, gap time being a time that a logical processor is inactive and waiting for a previous logical processor to finish a task; and
   repeating step (c) to arrive at an altered pre-assignment, said altered pre-assignment then subjected to a repeated rescheduling step (d) and analysis to determine if said gap time-based measure has been reduced.

* * * * *

UNITED STATES PATENT AND TRADEMARK OFFICE
CERTIFICATE OF CORRECTION

PATENT NO. : 5,418,953
DATED : May 23, 1995
INVENTOR(S) : Hunt et al

It is certified that error appears in the above-indentified patent and that said Letters Patent is hereby corrected as shown below:

On the title page: Item [73] Assignee data should read -- Loral/Rolm Mil-Spec Corp., San Jose, Calif. --.

Signed and Sealed this

Twenty-sixth Day of September, 1995

Attest:

BRUCE LEHMAN

Attesting Officer

Commissioner of Patents and Trademarks